United States Patent
Archambaud et al.

[11] Patent Number: 6,115,367
[45] Date of Patent: Sep. 5, 2000

[54] METHODS OF ANALYZING A RADIO SIGNAL AND METHODS OF ANALYZING A PERSONAL HANDY-PHONE SYSTEM RADIO SIGNAL

[75] Inventors: Denis Archambaud, Antibes; Patrick Feyfant, Toulon; Philippe Gaglione, Mandelieu; Varenka Martin, Antibes; Oliver Weigelt, Antibes; Laurent Winckel, Antibes; Satoshi Yoshida, Nice, all of France

[73] Assignee: VLSI Technology, Inc., Sunnyvale, Calif.

[21] Appl. No.: 08/906,341

[22] Filed: Aug. 5, 1997

[51] Int. Cl.[7] .................................................. H04B 17/02
[52] U.S. Cl. ........................ 370/334; 455/133; 455/277.1
[58] Field of Search ..................................... 370/334, 252, 370/328, 329, 331, 332, 333; 455/426, 462, 31.1, 67.1, 67.3, 101, 423, 132, 133, 134, 135, 277.1; 375/267, 347, 349

[56] References Cited

U.S. PATENT DOCUMENTS

| | | | |
|---|---|---|---|
| 5,203,024 | 4/1993 | Yamao | 370/334 |
| 5,203,026 | 4/1993 | Ekelund | 370/334 |
| 5,212,684 | 5/1993 | MacNames et al. | 370/334 |
| 5,329,555 | 7/1994 | Marko et al. | 370/334 |
| 5,555,258 | 9/1996 | Snelling et al. | 370/29 |
| 5,586,122 | 12/1996 | Suzuki et al. | 370/347 |
| 5,602,837 | 2/1997 | Takahashi | 370/280 |
| 5,636,243 | 6/1997 | Tanaka | 375/219 |

FOREIGN PATENT DOCUMENTS 8046565  2/1996  Japan.

OTHER PUBLICATIONS

Cordless in the Local Loop, by Margareta Zanichelli, from *Cordless Telecommunications Worldwide*, Walter H.W. Tuttlebee, pp. 71–87.

The PHS Standard, by Yuichiro Tokagawa, from *Cordless Telecommunications Worldwide*, Walter H.W. Tuttlebee, pp. 429–438.

*Personal Handy–Phone System (PHS) Guidebook*, Ministry of Posts & Telecommunications, Japan.

PHS RCR STD–28, Chapter 1, General, publication date ?.

*Primary Examiner*—Ricky Ngo
*Attorney, Agent, or Firm*—Wells, St. John, Roberts, Gregory & Matkin, P.S.

[57] ABSTRACT

The present invention provides methods of analyzing a radio signal, including a personal handy-phone system radio signal. In accordance with a first aspect of the present invention, a method of analyzing a radio signal in a transceiver selectively coupled with a first antenna and a second antenna comprises: receiving a radio signal comprising a plurality of slots via the first antenna; first configuring the transceiver to receive via the first antenna; during the receiving of a selected slot, first determining a radio signal characteristic; following the first determining and during the receiving of the selected slot, second configuring the transceiver to receive via the second antenna; and following the second configuring and during the receiving of the selected slot, second determining a radio signal characteristic.

37 Claims, 6 Drawing Sheets

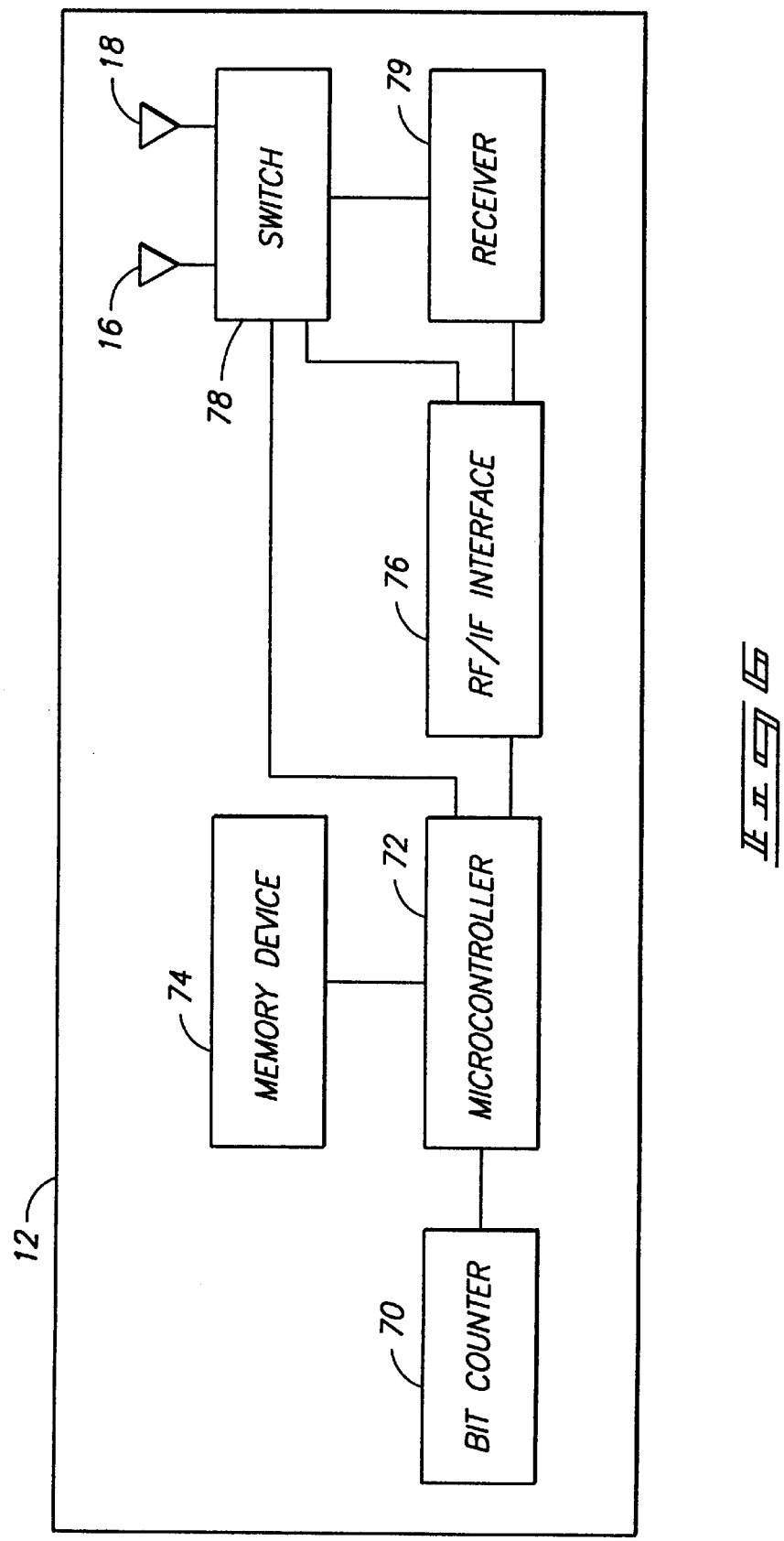

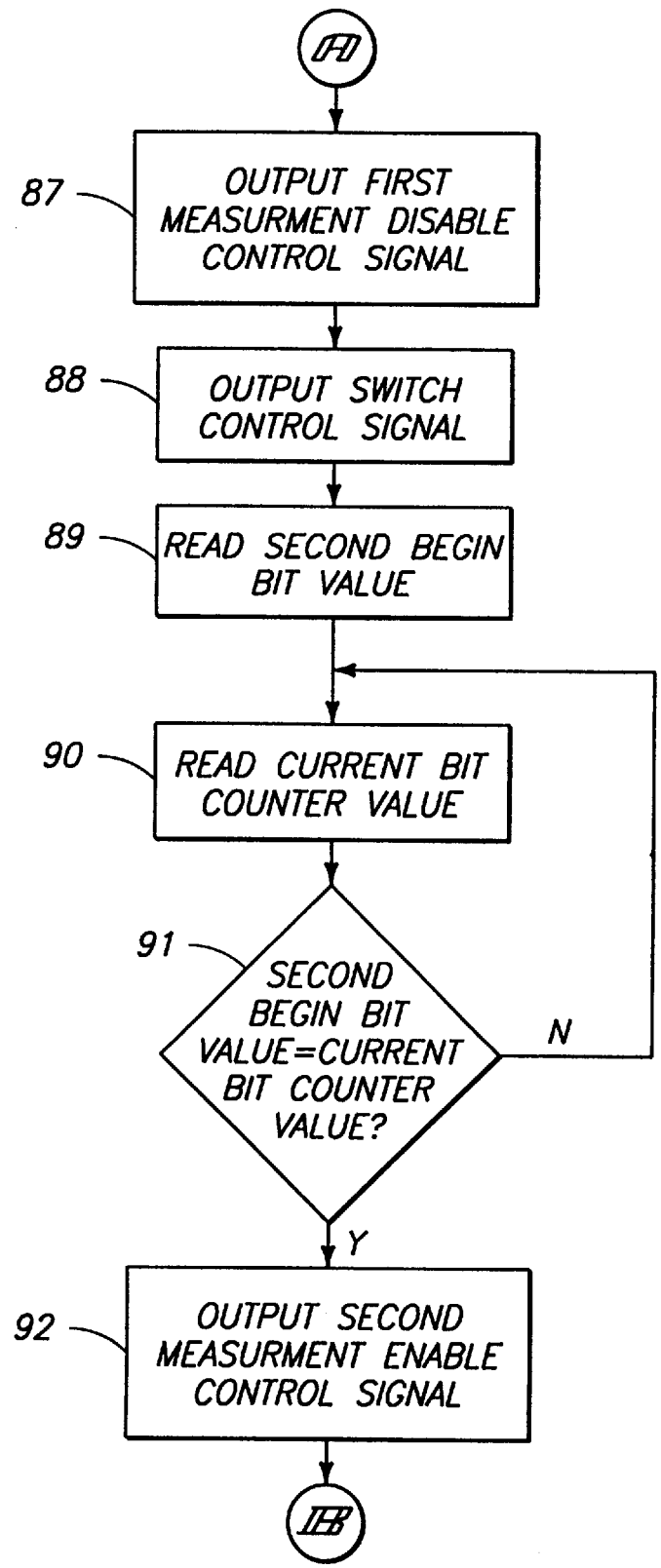

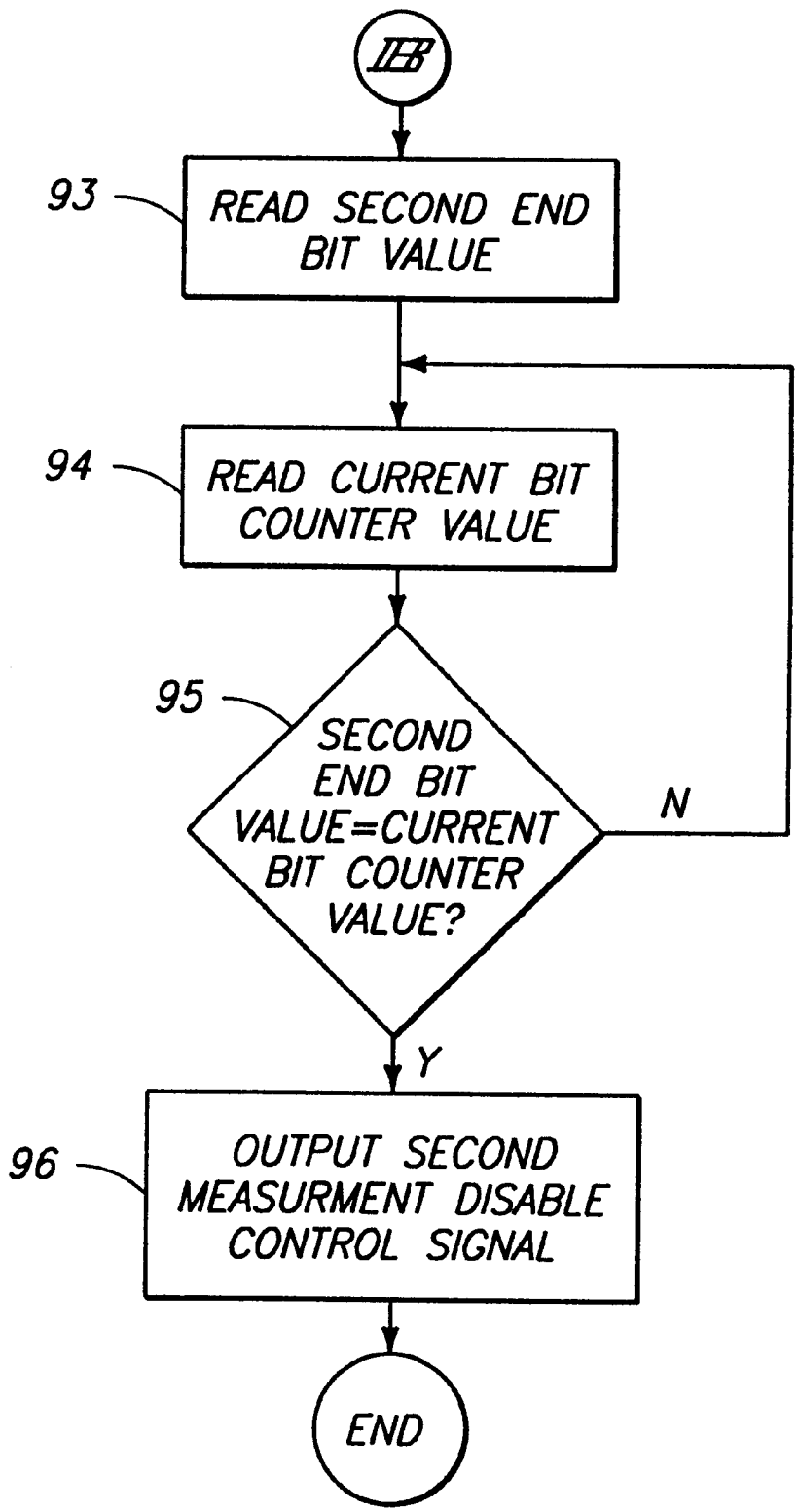

METHODS OF ANALYZING A RADIO SIGNAL AND METHODS OF ANALYZING A PERSONAL HANDY-PHONE SYSTEM RADIO SIGNAL

TECHNICAL FIELD

The present invention relates to methods of analyzing a radio signal, including a personal handy-phone system radio signal.

BACKGROUND OF THE INVENTION

The benefits of a wireless communication network are readily recognized. The ability to transmit and receive either voice or peripheral (i.e., facsimile) messages in mobile applications has been utilized in numerous applications.

Wireless communications systems include cellular systems which have particularly enjoyed expansive popularity. Cellular systems generally comprise a base station and a plurality of portable stations. Cellular systems offer a radius of approximately 1–15 km per base station, and traditionally provide coverage for cities, railways and main roads. However, existing cellular systems typically utilize a service network which is distinct from the existing network (e.g., Public Switched Telephone Network (PSTN) or Integrated Services Digital Network (ISDN)).

Other wireless communication protocols have been introduced to provide benefits over existing cellular wireless technologies. Such communication protocols provide benefits of interfacing directly with and utilizing the existing digital network. Such direct interfacing capabilities eliminate the need for a distinct switching system.

One such communication system is the personal handy-phone system (PHS). The personal handy-phone system is a digital cordless telephone system that offers integrated telecommunication services, such as voice and data, via a universal radio interface. The personal handy-phone system offers digitalization of the communication system. In particular, the digital personal handy-phone system offers improved quality and effective use of frequencies. The personal handy-phone system also offers flexible interconnectability wherein connection of a personal station with a plurality base stations at various locations such as the office, home, or outdoors is possible. The PHS standard is set forth by the Telecommunications Technical Committee of Japan in "Personal Handy Phone System", Japanese Telecommunications System Standard, RCR-STD 28.

The personal handy-phone system also offers connectability with existing communications networks. Connection is possible with analog telephone networks as well as digital networks.

Personal handy-phone systems typically comprise a plurality of personal stations (PS), also referred to as handsets, and base stations, also referred to as cell stations (CS). Personal handy-phone systems are designed to provide wireless multimedia communications, terminal mobility, and complete two way communications. Personal handy-phone systems utilize a micro-cell structure. Personal stations and base stations of the personal handy-phone system are configured to transmit and receive data via a plurality of data packets, also referred to as slots.

The base stations may be of a low power output type (i.e., 10 mW) generally for indoor applications, or a standard power output type (i.e., 20 mW) or high power output type (i.e., 100–500 mW) for outdoor applications. Group control functions may be implemented to increase communication channels in an area with heavy traffic whereby multiple base stations are controlled via the same control channel.

Base stations of the personal handy-phone system may individually include two antennas to provide antenna diversity. Such base stations typically offer enhanced radio signal communications compared with single antenna transceivers. The particular antenna utilized for reception of radio signals may be changed during receiving and preferably is selected to provide the strongest signal.

Conventional techniques of selecting the appropriate antenna for reception often result in the loss of data. In particular, such techniques specify switching the antenna diversity on communication channel (TCH) slots or slots containing valid data/voice information. Such switching enables analysis of the radio signals received via the respective antennas. However, switching antenna diversity in accordance with these techniques may result in the loss of data if signal quality has degraded a sufficient extent.

Therefore, it would be advantageous to provide a method of analyzing radio signals received via the respective base station antennas for use in selection of antenna diversity while minimizing the loss of data contained within the radio signals.

BRIEF DESCRIPTION OF THE DRAWINGS

Preferred embodiments of the invention are described below with reference to the following accompanying drawings.

FIG. 6 is a functional block diagram of an embodiment of the base station.

FIG. 7–FIG. 9 illustrate a flow diagram of a control process for analyzing received radio signals and switching antenna diversity within the base station.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

In accordance with a first aspect of the present invention, a method of analyzing a radio signal in a transceiver selectively coupled with a first antenna and a second antenna comprises: receiving a radio signal comprising a plurality of slots via the first antenna; first configuring the transceiver to receive via the first antenna; during the receiving of a selected slot, first determining a radio signal characteristic; following the first determining and during the receiving of the selected slot, second configuring the transceiver to receive via the second antenna; and following the second configuring and during the receiving of the selected slot, second determining a radio signal characteristic.

A second aspect of the present invention provides a method of analyzing a radio signal in a transceiver selectively coupled with a first antenna and a second antenna comprising: receiving a radio signal comprising a plurality of slots, the receiving the radio signal comprising: receiving a first portion of a selected slot via the first antenna; first configuring the transceiver to receive via the second antenna; receiving a second portion of the selected slot via the second antenna; determining a radio signal characteristic of the first portion of the selected slot; determining a radio signal characteristic of the second portion of the selected slot; comparing the determined radio signal characteristics of the respective first portion and the second portion; following the comparing, second configuring the transceiver to receive via one of the first antenna and the second antenna.

Another aspect of the present invention provides a method of analyzing a radio signal comprising: providing a base station having a first antenna and a second antenna; providing a personal station; transmitting a slot from the personal station; first receiving a first portion of the slot within the base station via the first antenna; and second receiving a second portion of the slot within the base station via the second antenna.

The present invention provides for analysis of the radio signals received via the respective antennas of a base station while minimizing the corruption of valid data. Preferred embodiments of the present invention provide switching of antennas of the base station during unused data fields of PHS slots or user defined slots to minimize the loss of data.

Figure 1:
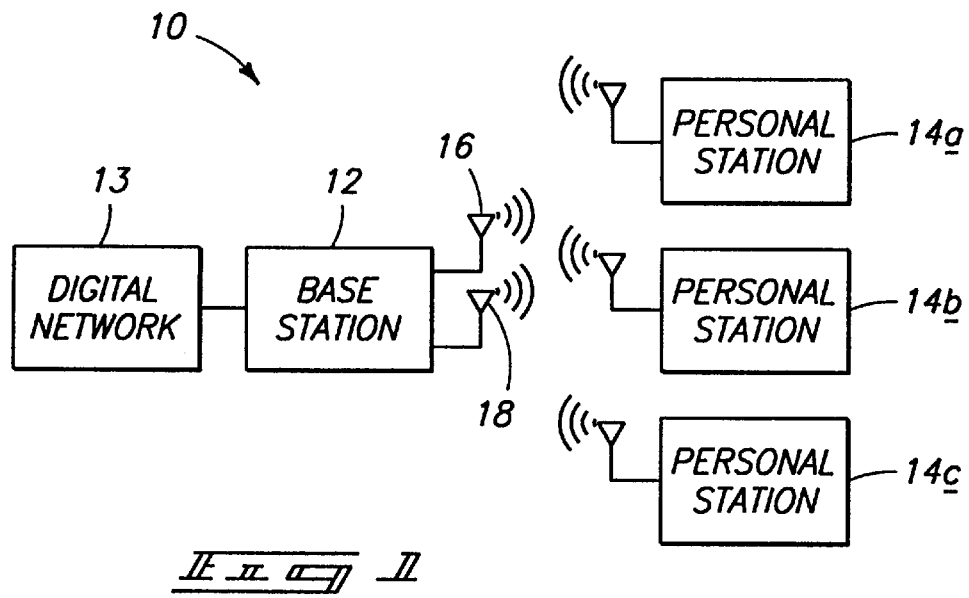
FIG. 1 is a block diagram of a personal handy-phone system comprising a base station and a plurality of personal stations in radio communication with the base station.

Referring to FIG. 1, a personal handy-phone system (PHS) 10 is shown. The illustrated personal handy-phone system 10 comprises a base station 12 and a plurality of personal stations 14a–14c. Base station 12 is typically fixed and coupled with a digital network 13, such as an ISDN or PSTN. A given cell may contain plural base stations 12 depending upon the traffic volume to be handled.

The personal handy-phone system is configured to allow movement of the personal stations 14 throughout a cell during communication with a respective base station 12. Base stations 12 are configured to handover communications with a corresponding personal station 14 to an adjacent base station 12 responsive to the movement of the personal station 14. Personal stations 14 are also configured provide mobile radio communications directly to other personal stations 14.

Base station 12 includes a first antenna 16 and second antenna 18 for providing antenna diversity. Antenna diversity provides improved spectral efficiency. As is described in detail below, aspects of the present invention provide methods of selecting one of the first antenna 16 and second antenna 18 for improved receive operations.

The radio interfaces of the base station 12 and personal stations 14 individually have four-channel time division multiple access capability with time division duplexing (4-channel TDMA-TDD). This communication protocol provides one control channel and three traffic channels for an individual base station 12. Providing time division multiple access capability with time division duplexing avoids the need for paired frequency bands.

Figure 2:
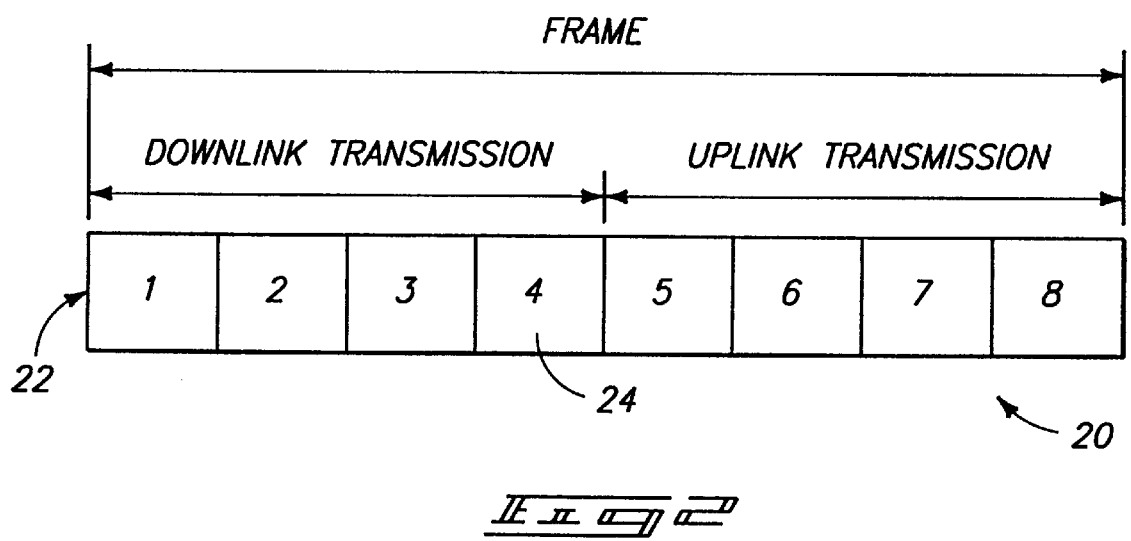
FIG. 2 is an illustrative view of a frame structure according to the personal handy-phone system communication protocol.

Referring to FIG. 2, a typical radio channel structure 20 is shown. The radio channel structure comprises a frame 22 which comprises a plurality of slots 24 (eight slots are shown defining one frame in FIG. 2). In particular, one five millisecond TDMA-TDD frame within the radio channel structure 20 includes four slots for base station transmission, and four slots for personal station transmission. Communications from base station 12 to respective personal stations 14, referred to herein as downlink communications, occur within the first four slots 24 of the frame 22 (i.e., slots 1–4). Communications from 8 respective personal stations 14 to the base station 12, referred to herein as uplink communications, occur within the subsequent four slots of the illustrated frame 22 (i.e., slots 5–8).

A slot may contain either a control channel (CCH), communication channel (TCH) or synchronization information (SYNCHRONOUS BURST). The communication channel may provide for user defined transmissions within first and second User Packet Channels (also referred to as UPCH1 and UPCH2). A guard field comprising sixteen guard bits is typically provided intermediate adjacent slots 24.

Figure 3:
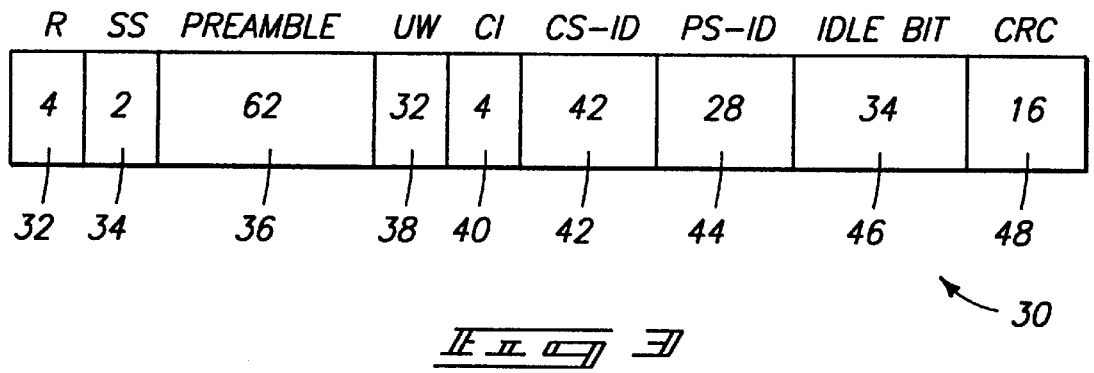
FIG. 3 is an illustrative view of the structure of a SYNCHRONOUS BURST slot according to the personal handy-phone system communication protocol.

Synchronization of the personal stations 14 and the corresponding base station 12 is required prior to communication. Referring to FIG. 3, a SYNCHRONOUS BURST slot 30 utilized for providing synchronization is shown. The SYNCHRONOUS BURST slot 30 is exchanged between the base station 12 and the respective personal station 14 before the TCH link is established, TCH switching takes place or handover to another base station takes place. Further, SYNCHRONOUS BURST slot 30 may be exchanged responsive to degradation of communication quality.

The SYNCHRONOUS BURST slot 30 comprises 224 bits, thus allowing sixteen guard bits. A ramp field (R) 32 of the SYNCHRONOUS BURST slot 30 comprises four ramp bits and a start symbol field (SS) 34 comprises two start symbol bits. A preamble 36 follows start symbol field 34 and comprises sixty-two bits.

The SYNCHRONOUS BURST slot 30 additionally comprises a unique word (UW) 38 of thirty-two bits which follows the preamble 36. The unique word 38 is a predetermined pattern which establishes transmit and receive timing. A channel identifier field (CI) 40 of four bits is next provided, followed by additional identification fields. In particular, a cell station identification field (CS-ID) 42 of forty-two bits, and personal station identification field (PS-ID) 44 of twenty-eight bits are provided. An idle bit field 46 and a cyclic redundancy check field (CRC) 48 respectively follow the identification fields. The idle bit field 46 is typically not utilized and is programmable by the user.

The control channel (CCH) may be one of a variety of formats in accordance with the personal handy-phone system standard. The control channel is composed of a combination of a common control channel (CCCH) and an associated control channel (ACCH). The common control channel and associated control channel make up a single dedicated channel providing improved performance in conditions of intermittent communications reception.

The communication channel is also referred to as a traffic channel (TCH) and is utilized to transmit user traffic information. As previously mentioned, the personal handy-phone system standard additionally provides for two User Packet Channels, UPCH1 and UPCH2. More specifically, the User Packet Channels are utilized to transmit control signal information as well as user packet data.

Figure 4:
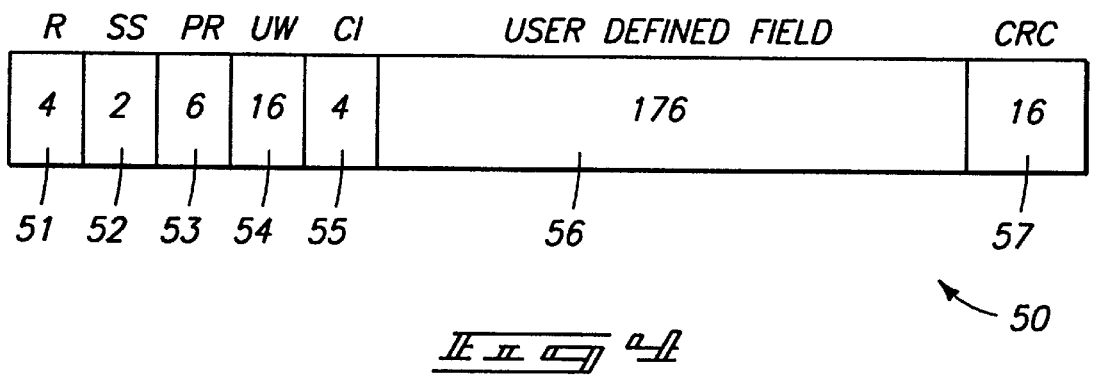
FIG. 4 is an illustrative view of the structure of a first User Packet Channel slot according to the personal handy-phone system communication protocol.

Referring to FIG. 4, a first User Packet Channel slot (UPCH1) 50 is shown. The first user packet channel slot (UPCH1) 50 comprises a ramp field (R) 51 of four bits, start symbol field (SS) 52 of two bits, a preamble 53 of sixty-two bits, a unique word (UW) 54 of sixteen bits, and a channel identifier field (CI) 55 of four bits. A user defined field 56 of 176 bits and a cyclic redundancy check field (CRC) 57 of sixteen bits are provided after the channel identifier 55.

Figure 5:
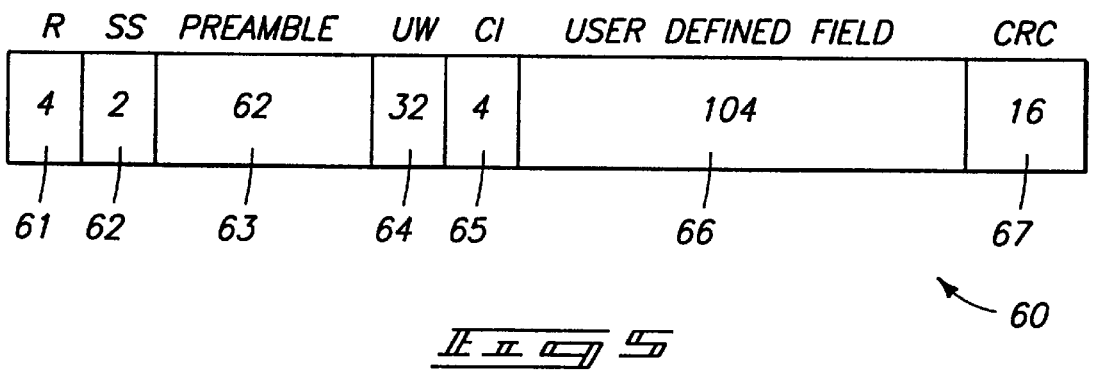
FIG. 5 is an illustrative view of the structure of a second User Packet Channel slot according to the personal handy-phone system communication protocol.

Referring to FIG. 5, a second User Packet Channel slot (UPCH2) 60 is shown. Similar to UPCH1 slot 50, UPCH2 slot 60 comprises a ramp field (R) 61 of four bits and a start symbol field (SS) 62 of two bits. UPCH2 slot 60 additionally comprises a preamble 63 of sixty-two bits, unique word (UW) 64 of thirty-two bits, and a channel identifier field (CI) 65 of four bits. A user defined field 66 of 104 bits and a cyclic redundancy check field (CRC) 67 of sixteen bits are provided after the channel identifier field 65.

Base station 12 and personal stations 14 respectively include a base station transceiver and personal station transceiver individually configured to provide radio frequency (RF) signal communications between the respective stations 12, 14. For uplink and downlink communications, a carrier signal is modulated by a baseband signal which contains the control and communication information in accordance with the PHS protocol slot format.

The present invention provides methods of measuring at least one signal characteristic of the radio signal transmitted from a personal station 14 to the corresponding base station 12 (i.e., uplink communication) during a selected slot. The signal characteristic in accordance with one aspect of the present invention is the Radio Signal Strength Indication (RSSI) of the transmitted radio signal. Such measuring of radio signal characteristics may be utilized to ensure robust communications between base station 12 and corresponding personal stations 14. Therefore, in accordance with one embodiment of the present invention, such measurements may be initiated responsive to the detection of degradation of signal quality.

The preferred methods of the present invention provide obtaining two measurements of the signal characteristic of the radio signal during the reception of a single selected slot at the base station 12. More particularly, the present invention provides for measuring a first RSSI value and second RSSI value of the radio signal during the reception of the selected slot. The first RSSI value is preferably measured during the reception of the radio signal via first antenna 16. The second RSSI value is preferably measured during the reception of the radio signal via second antenna 18. Therefore, it is necessary to alter the configuration of base station 12 during the reception of the selected slot.

The first and second RSSI measurements are determined from the radio signal containing respective first and second portions of the selected slot. Base station 12 is preferably configured to receive the radio signal transmitted from personal station 14 via first antenna 16 during the reception of the first portion of the selected slot. Following the reception of the first portion of the selected slot and during the reception of the selected slot, the base station 12 is configured to receive the radio signal via the second antenna 18. Following the configuring of the base station 12, the radio signal comprising the second portion of the slot is received within the base station 12. Both signal characteristics (e.g., first RSSI measurement and second RSSI measurement) are measured during the reception of the selected slot.

The selected slot is preferably one of first User Packet Channel (UPCH1) slot 50, second User Packet Channel (UPCH2) slot 60 or SYNCHRONOUS BURST slot 30. User Packet Channel (UPCH1 and UPCH2) slots 50, 60 individually include respective user defined fields 56, 66 and SYN-CHRONOUS BURST slot 30 includes idle bit field 46. To prevent the loss of control or communication information, it is preferred to configure the base station 12 during the reception of a user defined field 56, 66 or idle bit field 46. Such configuring includes configuring the receiver of base station 12 to receive via second antenna 18 instead of first antenna 16 (or vice versa).

First RSSI measurement is preferably determined prior to the reception of user defined fields 56, 66 of User Packet Channel slots 50, 60 or idle bit field 46 of SYNCHRONOUS BURST slot 30. The second RSSI measurement is preferably determined during the reception of user defined fields 56, 66 of User Packet Channel slots 50, 60 or idle bit field 46 of SYNCHRONOUS BURST slot 30.

Referring to FIG. 6, an embodiment of base station 12 is shown. The illustrated embodiment of base station 12 comprises a bit counter 70, microcontroller 72, memory device 74, RF/IF interface 76, switch 78 and receiver 79.

Bit counter 70 operates to count the bits of the slots received within base station 12. As such, bit counter 70 also inherently operates to identify the current position (i.e, bit) of the slot being received by base station 12.

Microcontroller 72 is a processor operable to monitor functions and control the operations of base station 12. Microcontroller 74 is coupled with a memory device 74. In one embodiment, memory device 74 comprises volatile memory permitting flexibility of storing different operational software code. In an alternative embodiment, memory device 74 comprises an EEPROM or non-volatile memory for storing software code utilized by microcontroller 72. The operation of base station 12 may be controlled via software code.

Respective first and second antennas 16, 18 are coupled with switch 78. Switch 78 is operable to selectively couple one of antennas 16, 18 with receiver 79. Switch 78 is preferably a GaAs FET or comparable switch to provide high speed switching capabilities.

The signal received via the selected first or second antenna 16, 18 is applied to the receiver 79. Receiver 79 includes appropriate control and demodulation circuitry for receiving radio signals transmitted from corresponding personal stations 14. Receiver 79 recovers the baseband signal from the received RF radio signal. The baseband signal is applied to RF/IF interface 76.

RF/IF interface 76 comprises circuitry operable to provide the RSSI measurements of the received baseband signal. Further, RF/IF interface 76 comprises circuitry configured to compare a first RSSI measurement with a second RSSI measurement. In the illustrated embodiment, RF/IF interface 76 additionally comprises control circuitry configured to operate switch 78 and the coupling thereby of first and second antennas 16, 18 with receiver 79. Responsive to the comparison of the RSSI measurements, RF/IF interface 76 applies a control signal to switch 78 to select one of first and second antennas 16, 18. In one embodiment, RF/IF interface 76 is additionally configured to initiate analysis of the radio signal characteristics (e.g., performing RSSI measurements of the radio signals received via the respective antennas 16, 18) responsive to the detection of degradation of signal quality.

The selection of one of the antennas 16, 18 preferably corresponds to the radio signal received via one of antennas 16, 18 having the highest RSSI measurement. For example, first antenna 16 is chosen if the radio signal received thereby has the highest RSSI measurement value. Such selection provides robust radio frequency communication of the personal stations 14 with the corresponding base station 12.

Alternatively, microcontroller 78 may be configured to control switch 78 responsive to the comparison of the RSSI measurements. In such a configuration, switch 78 is coupled with microcontroller 72 and configured to receive control signals therefrom. The RF/IF interface 76 provides RSSI information from radio signals received via respective antennas 16, 18 to microcontroller 72. In one embodiment, microcontroller 72 is configured, via software code within memory device 74, to analyze the RSSI information and determine whether a switch of the coupling of antennas 16, 18 with receiver 79 is necessary. Responsive to receiving the RSSI information and following analysis thereof, microcontroller 72 outputs a selection control signal to switch 78 to couple the appropriate first or second antenna 16, 18 to the receiver 79.

Microcontroller 72 is also operable to control the positioning of the RSSI measurements with respect to the selected slot. In the illustrated embodiment, microcontroller 72 is configured via software code to control the RSSI measurements of RF/IF interface 76 responsive to the bit value generated by bit counter 70. Further, microcontroller 72 is configured via software code to control the timing of the switching of antennas 16, 18 intermediate the first RSSI measurement and the second RSSI measurement.

Figure 7I:
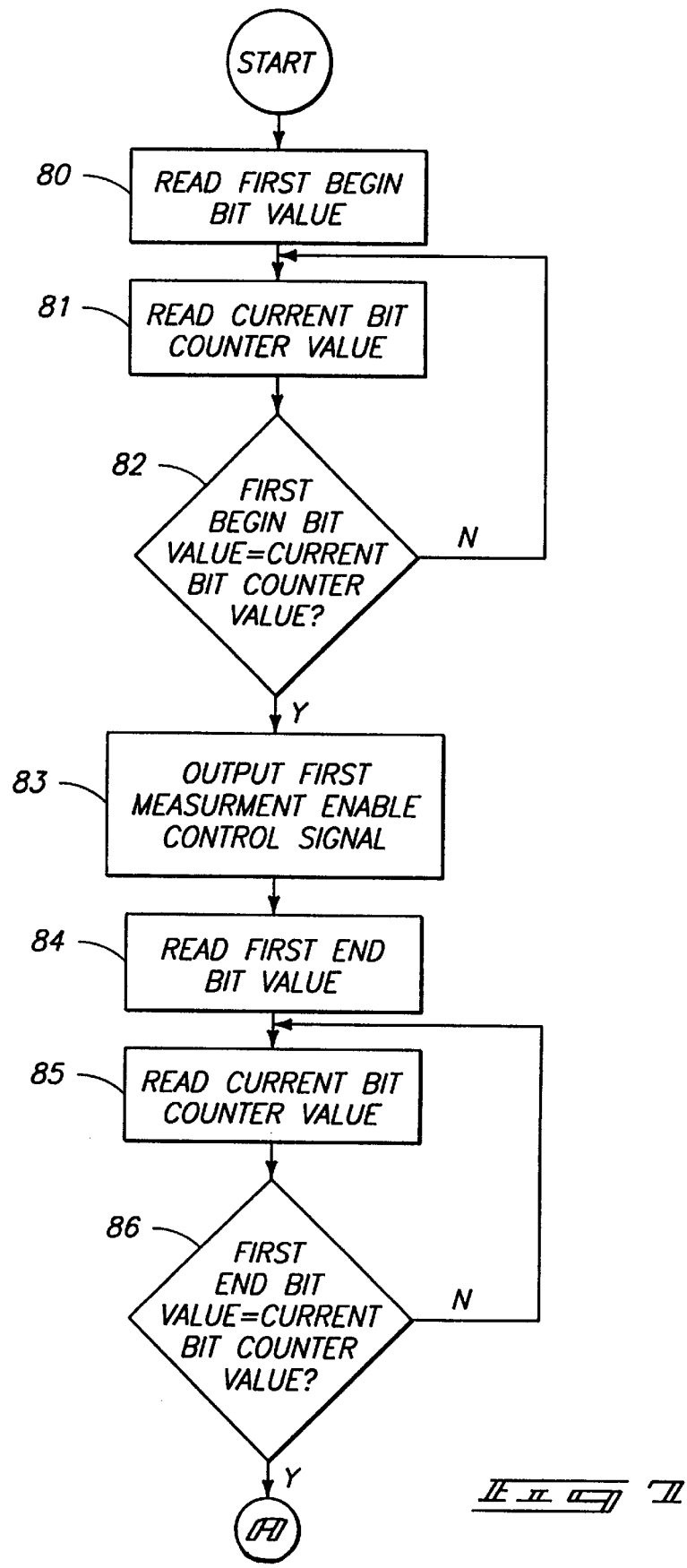

Referring to FIG. 7–FIG. 9, the above mentioned software for providing the RSSI measurements and the switching of antennas 16, 18 is described with reference to a flow chart. It is preferred to implement such control by software to increase flexibility of the antenna diversity selection operations. The flow chart describes a control process that is implemented by digital circuitry in an alternative embodiment.

Referring first to FIG. 7, a first begin bit value is retrieved from memory device 74 by microcontroller 72 at step 80. Next, the current bit counter value is retrieved by microcontroller 72 from bit counter 70 at step 81. Microcontroller 72 thereafter compares the first begin bit value with the current bit counter value at step 82. If the first begin bit value is not equal to the current bit counter value, the microcontroller 72 proceeds to step 81 and reads the next current bit counter value from bit counter 70. Microcontroller 72 continues to retrieve and disregard bit counter values retrieved from bit counter 70 until the condition at step 82 is satisfied wherein the first begin bit is equal to the current bit counter value.

Following the satisfaction of the condition at step 82, microcontroller 72 outputs a first measurement enable control signal to RF/IF interface 76 at step 83. RF/IF interface 76 begins measuring the RSSI characteristic of the received RF signal responsive to receiving the measurement enable control signal generated by microcontroller 72. The radio signal utilized for this first RSSI measurement is received via first antenna 16.

During step 84, microcontroller 72 reads a first end bit value from memory device 74. Thereafter, microcontroller 72 reads the current bit counter value from bit counter 70 in step 85. In step 86, microcontroller 72 compares the first end bit value with the current bit counter value. If the first end bit value is not equal to the current bit counter value, the microcontroller 72 continues to read and compare current bit counter values with the first end bit value.

Referring to FIG. 8, once the current bit counter value is equal to the first end bit value, the microcontroller 72 outputs a first measurement disable control signal to RF/IF interface 76 at step 87. Responsive to receiving the first measurement disable control signal, RF/IF interface 76 ceases the first RSSI measurement of the RF signal received via first antenna 16. Following the disablement of the first RSSI measurement, microcontroller 72 outputs a switch control signal to switch 78 to select the second antenna 18 at step 88. Switch 78 couples second antenna 18 with receiver 80 responsive to receiving the switch control signal.

Following the output of the first measurement disable control signal, a second begin bit value is retrieved from the memory device 74 by microcontroller 72 at step 89. Next, the current bit counter value is retrieved by microcontroller 72 from the bit counter 70 at step 90.

Microcontroller 72 thereafter compares the second begin bit value with the current bit counter value at step 91. If the second begin bit is not equal to the current bit counter value, microcontroller 72 reads the next current bit counter value from bit counter 70 at step 90. Microcontroller 72 continues to retrieve and disregard bit counter values from bit counter 70 until the condition at step 91 is satisfied wherein the second begin bit is equal to the current bit counter value.

Following the satisfaction of the condition at step 91, microcontroller 72 outputs a second measurement enable control signal to RF/IF interface 76 at step 92. RF/IF interface 76 begins measuring the RSSI characteristic of the received RF signal responsive to receiving the second measurement enable control signal generated in step 92. The RP signal utilized for this second RSSI measurement is received via second antenna 18.

Referring to FIG. 9, microcontroller 72 reads a second end bit value from memory device 74 in step 93. Thereafter, microcontroller 72 reads the current bit counter value from bit counter 70 in step 94. In step 95, microcontroller 72 compares the second end bit value with the current bit value. If the second end bit value is not equal to the current bit counter value, microcontroller 72 continues to read and compare current bit counter values with the second end bit value. Once the current bit counter value is equal to the second end bit value, microcontroller 72 outputs a measurement disable control signal to RF/IF interface 76 at step 96.

Responsive to receiving the second measurement disable control signal, RF/IF interface 76 ceases the second RSSI measurement of the RF signal received via second antenna 18. Thereafter, RF/IF interface 76 is operable to compare the first and second RSSI measurements and select one of the first and second antennas 16, 18 for coupling with receiver 79.

In the illustrated embodiment, the commencing and ceasing of the first and second RSSI measurements of the received radio signal are fully programmable with respect to the received slot. Such programmability provides flexibility in selecting the portions of a slot where RSSI measurements are taken. In addition, the exact position within a slot where the switch 78 changes the coupling of the first or second antenna 16, 18 with the receiver 79 is fully programmable in the illustrated embodiment.

Such a configuration enables switching of the antennas 16, 18 (e.g., switch from receiving via first antenna 16 to receiving via second antenna 18 or vice versa) during the idle bit field 46 or user defined field 56, 66. Utilizing the methods in accordance with the present invention, any loss of data is minimized. In particular, no data is lost if the antenna switching is provided within an unused field (e.g., the idle bit field 46 of a SYNCHRONOUS BURST slot 30 or user defined fields 56, 66 of respective UPCH1 slot 50 or UPCH2 slot 60).

In addition, begin bit values and end bit values may be programmed via software code such that the length of the respective RSSI measurements during the receiving of the slots may be varied according to user needs or communication protocol. The first begin bit value and first end bit value define the first portion of the selected slot. The second begin bit value and second end bit value define the second portion of the selected slot.

Depending upon the particular type of slot being received, the begin bit should be a particular value. For example, for a SYNCHRONOUS BURST slot 30, the first begin bit value may be chosen to commence the first RSSI measurement during the unique word (UW) field 38. Referring again to FIG. 3, the first begin bit value may be bit sixteen of the unique word field 38. The first end bit value may be chosen to end the first RSSI measurement immediately prior to the idle bit field 46. In particular, the first end bit value may be bit twenty-five of the personal station identification field 44. Thereafter, the antenna diversity may be switched at the beginning of the idle bit field 46. Thus, the first RSSI measurement is completed prior to the reception of the user defined field 46 enabling switching of antenna diversity within field 44 and thereby reducing loss of data or control information.

The second RSSI measurement may be commenced following the switching of antenna diversity. The second begin bit value may be bit four of idle bit field 46 and the second end bit value may be bit thirty of field 46. Thereafter, the appropriate antenna 16, 18 (i.e., the antenna providing the best signal) is coupled with receiver 79 prior to receiving the CRC field 48.

Referring again to FIG. 4, possible begin bit and end bit values are discussed with reference to first User Packet Channel slot 50. For providing the first RSSI measurement, the first begin bit value corresponds to bit ten of the user defined field 56 and the first end bit value corresponds to bit eighty-six of user defined field 56. The switching of antenna diversity occurs at approximately bit eighty-eight of field 56. For providing the second RSSI measurement, second begin bit value corresponds to bit ninety and second end bit value corresponds to bit 170 of field 56. The appropriate antenna 16, 18 is selected prior to receiving CRC field 57.

Referring again to FIG. 5, possible begin bit and end bit values are discussed with reference to second User Packet Channel slot 60. For providing the first RSSI measurement, first begin bit value corresponds to bit sixteen of unique word field 64 and the first end bit value corresponds to bit forty-six of user defined field 66. The switching of antenna diversity occurs at approximately bit fifty of field 66. For providing the second RSSI measurement, second begin bit value corresponds to bit fifty-four and second end bit value corresponds to bit ninety-eight of field 66. The appropriate antenna 16, 18 is selected prior to receiving CRC field 67.

The exemplary begin and end bit values discussed herein are for illustrative purposes only. Such begin and end bit values may be selected at any position within the slot. In addition, the begin and end bit values may extend over a plurality of slots to provide increased flexibility in analyzing the received radio signal. The methods of the present invention provide increased flexibility, and the begin and end bit values are preferably chosen to minimize or eliminate the loss of transmitted data or control information.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of analyzing a radio signal in a receiver selectively coupled with a first antenna and a second antenna comprising:

receiving a radio signal comprising a plurality of slots via the first antenna;

first configuring the receiver to receive via the first antenna;

during the receiving of a selected slot, first determining a radio signal characteristic;

identifying a portion of the selected slot;

following the identifying and during the receiving of the selected slot, second configuring the receiver to receive via the second antenna; and following the second configuring and during the receiving of the selected slot, second determining a radio signal characteristic.

2. The method according to claim 1 wherein the receiver comprises a personal handy-phone system base station.

3. The method according to claim 1 wherein the first and second radio signal characteristics are radio signal strength indication values.

4. The method according to claim 1 wherein the selected slot is one of a SYNCHRONOUS BURST slot, a first User Packet Channel slot and a second User Packet Channel slot.

5. The method according to claim 1 further comprising detecting signal degradation of the radio signal prior to the first determining.

6. The method according to claim 1 wherein the second configuring comprises switching the coupling of the first antenna with the receiver with the coupling of the second antenna with the receiver.

7. A method of analyzing a radio signal in a receiver selectively coupled to a first antenna and a second antenna comprising:

receiving a radio signal comprising a plurality of slots, the receiving the radio signal comprising:

receiving a first portion of a selected slot via the first antenna;

first configuring the receiver to receive via the second antenna during a user programmable portion of the selected slot;

receiving a second portion of the selected slot via the second antenna after the first configuring;

determining a radio signal characteristic of the first portion of the selected slot;

determining a radio signal characteristic of the second portion of the selected slot;

comparing the determined radio signal characteristics of the respective first portion and the second portion; and following the comparing, second configuring the receiver to receive via one of the first antenna and the second antenna.

8. The method according to claim 7 wherein the receiver comprises a personal handy-phone system base station.

9. The method according to claim 7 wherein the first and second radio signal characteristics are radio signal strength indication values.

10. The method according to claim 7 wherein the first configuring comprises switching the coupling of the first antenna with the receiver with the coupling of the second antenna with the receiver.

11. The method according to claim 7 wherein prior to the receiving of the radio signal, configuring the receiver to receive via the first antenna.

12. The method according to claim 7 further comprising detecting signal degradation of the radio signal.

13. The method according to claim 7 wherein the selected slot comprises a SYNCHRONOUS BURST slot including at least one identification field and an idle bit field.

14. The method according to claim 13 wherein the first portion comprises at least one identification field and the second portion comprises at least a portion of the idle bit field.

15. The method according to claim 13 wherein the first configuring occurs during the receiving of the idle bit field.

16. The method according to claim 7 wherein the selected slot comprises one of a first User Packet Channel slot and a second User Packet Channel slot.

17. The method according to claim 16 wherein the first User Packet Channel slot and the second User Packet Channel slot individually comprise a user defined field.

18. The method according to claim 17 wherein the first portion and the second portion of the selected slot comprise respective portions of the user defined field.

19. The method according to claim 17 wherein the configuring occurs during the receiving of the user defined field.

20. A method of analyzing a radio signal comprising:
   providing a base station having a first antenna and a second antenna;
   providing a personal station;
   transmitting a slot from the personal station;
   first receiving a first portion of the slot within the base station via the first antenna;
   switching from the first antenna to the second antenna during a predefined portion of a slot; and
   second receiving a second portion of the slot within the base station via the second antenna after the switching.

21. The method according to claim 20 wherein the base station comprises a personal handy-phone system base station and the personal station comprises a personal handy-phone system personal station.

22. The method according to claim 20 further comprising determining respective radio signal characteristics during the first receiving and the second receiving.

23. The method according to claim 20 wherein the radio signal characteristics comprise radio signal strength indication values.

24. The method according to claim 20 further comprising prior to the first receiving, configuring the base station to receive via the first antenna.

25. The method according to claim 20 further comprising prior to the second receiving, configuring the base station to receive via the second antenna.

26. The method according to claim 20 further comprising detecting signal degradation of the radio signal.

27. The method according to claim 20 wherein the selected slot is a SYNCHRONOUS BURST slot comprising an identification field and an idle bit field.

28. The method according to claim 27 wherein the first portion comprises at least a portion of an identification field and the second portion comprises at least a portion of the idle bit field.

29. The method according to claim 20 wherein the selected slot is one of a first User Packet Channel slot and a second User Packet Channel slot.

30. The method according to claim 29 wherein the first User Packet Channel slot and the second User Packet Channel slot individually comprise a user defined field.

31. The method according to claim 30 wherein the first portion comprises at least a first portion of the user defined field.

32. The method according to claim 30 wherein the second portion comprises at least a second portion of the user defined field.

33. A method of analyzing a personal handy-phone system radio signal comprising:
   providing a base station having a first antenna and a second antenna;
   first configuring the base station to receive via the first antenna;
   receiving a radio signal comprising a plurality of slots;
   first determining a radio signal strength indication value of a first portion of the selected slot during the receiving of the selected slot;
   following the first determining and during the receiving of another portion of the the selected slot substantially free of data to be communicated, second configuring the base station to receive via the second antenna;
   following the second configuring and during the receiving of the selected slot, second determining a radio signal strength indication value of a second portion of the selected slot;
   comparing the respective radio signal strength indication values of the first portion and the second portion of the selected slot; and
   following the comparing, third configuring the base station to receive via one of the first antenna and the second antenna.

34. The method according to claim 1 wherein the identifying comprises identifying the portion comprising a user programmable portion.

35. The method according to claim 1 wherein the identifying comprises identifying the portion comprising a portion substantially free of data to be communicated.

36. The method according to claim 20 wherein the switching comprises switching during a user programmable portion of the slot.

37. The method according to claim 20 wherein the switching comprises switching during a portion of the slot substantially free of data to be communicated.

* * * * *